US007924443B2

(12) United States Patent
Moore

(10) Patent No.: US 7,924,443 B2
(45) Date of Patent: Apr. 12, 2011

(54) PARALLEL PRINTING SYSTEM

(75) Inventor: Steven R. Moore, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 1063 days.

(21) Appl. No.: 11/485,870

(22) Filed: Jul. 13, 2006

(65) Prior Publication Data

US 2008/0018915 A1 Jan. 24, 2008

(51) Int. Cl.
*G06K 15/00* (2006.01)

(52) U.S. Cl. ...................................................... 358/1.12

(58) Field of Classification Search ................. 358/1.12, 358/1.1, 401, 501, 524; 355/101, 109, 114, 355/115, 116
See application file for complete search history.

(56) References Cited

U.S. PATENT DOCUMENTS 4,579,446 A 4/1986 Fujino et al.
4,587,532 A 5/1986 Asano
4,602,776 A 7/1986 York et al.
4,836,119 A 6/1989 Siraco et al.
5,004,222 A 4/1991 Dobashi
5,008,713 A 4/1991 Ozawa et al.
5,080,340 A 1/1992 Hacknauer et al.
5,095,342 A 3/1992 Farrell et al.
5,159,395 A 10/1992 Farrell et al.
5,208,640 A 5/1993 Horie et al.
5,272,511 A 12/1993 Conrad et al.
5,326,093 A 7/1994 Sollitt
5,435,544 A 7/1995 Mandel
5,473,419 A 12/1995 Russel et al.
5,489,969 A 2/1996 Soler et al.
5,504,568 A 4/1996 Saraswat et al.
5,525,031 A 6/1996 Fox
5,557,367 A 9/1996 Yang et al.
5,568,246 A 10/1996 Keller et al.
5,570,172 A 10/1996 Acquaviva
5,596,416 A * 1/1997 Barry et al. .................. 358/296
5,629,762 A 5/1997 Mahoney et al.
5,655,759 A 8/1997 Perkins et al.
5,710,968 A 1/1998 Clark et al.
5,778,377 A 7/1998 Marlin et al.
5,884,910 A 3/1999 Mandel
5,995,721 A 11/1999 Rourke et al.
6,059,284 A 5/2000 Wolf et al.
6,125,248 A 9/2000 Moser (Continued)

FOREIGN PATENT DOCUMENTS

EP 1 531 610 5/2005

(Continued)

OTHER PUBLICATIONS

European Search Report for Application No. EP 07 11 2206, search completed Oct. 22, 2007; 10 pages.

(Continued)

*Primary Examiner* — Benny Q Tieu
*Assistant Examiner* — Ngon Nguyen
(74) *Attorney, Agent, or Firm* — Fay Sharpe LLP

(57) ABSTRACT

Disclosed is a print media interposer system and method. The print media interposer system comprises two or more interposer modules, one or more interface modules, and a controller. The interposer modules are adapted to receive one or more print media input stacks from one or more printing systems. Subsequently, the print media interposer system merges the received print media input stacks in a predetermined sequence.

13 Claims, 6 Drawing Sheets

U.S. PATENT DOCUMENTS

| | | | | |
|---|---|---|---|---|
| 6,241,242 | B1 | 6/2001 | Munro | |
| 6,297,886 | B1 | 10/2001 | Cornell | |
| 6,341,773 | B1 | 1/2002 | Aprato et al. | |
| 6,384,918 | B1 | 5/2002 | Hubble, III et al. | |
| 6,450,711 | B1 | 9/2002 | Conrow | |
| 6,476,376 | B1 | 11/2002 | Biegelsen et al. | |
| 6,476,923 | B1 | 11/2002 | Cornell | |
| 6,493,098 | B1 | 12/2002 | Cornell | |
| 6,537,910 | B1 | 3/2003 | Burke et al. | |
| 6,550,762 | B2 | 4/2003 | Stoll | |
| 6,554,276 | B2 | 4/2003 | Jackson et al. | |
| 6,577,925 | B1 | 6/2003 | Fromherz | |
| 6,607,320 | B2 | 8/2003 | Bobrow et al. | |
| 6,608,988 | B2 | 8/2003 | Conrow | |
| 6,612,566 | B2 | 9/2003 | Stoll | |
| 6,612,571 | B2 | 9/2003 | Rider | |
| 6,621,576 | B2 | 9/2003 | Tandon et al. | |
| 6,633,382 | B2 | 10/2003 | Hubble, III et al. | |
| 6,639,669 | B2 | 10/2003 | Hubble, III et al. | |
| 6,727,999 | B1 | 4/2004 | Takahashi | |
| 6,819,906 | B1 | 11/2004 | Herrmann et al. | |
| 6,925,283 | B1 | 8/2005 | Mandel et al. | |
| 6,959,165 | B2 | 10/2005 | Mandel et al. | |
| 6,973,286 | B2 | 12/2005 | Mandel et al. | |
| 7,024,152 | B2 | 4/2006 | Lofthus et al. | |
| 2002/0078012 | A1 | 6/2002 | Ryan et al. | |
| 2002/0103559 | A1 | 8/2002 | Gartstein | |
| 2003/0077095 | A1 | 4/2003 | Conrow | |
| 2003/0146559 | A1 | 8/2003 | Middelberg et al. | |
| 2004/0085561 | A1 | 5/2004 | Fromherz | |
| 2004/0085562 | A1 | 5/2004 | Fromherz | |
| 2004/0088207 | A1 | 5/2004 | Fromherz | |
| 2004/0150156 | A1 | 8/2004 | Fromherz et al. | |
| 2004/0150158 | A1 | 8/2004 | Biegelsen et al. | |
| 2004/0153983 | A1 | 8/2004 | McMillan | |
| 2004/0216002 | A1 | 10/2004 | Fromherz et al. | |
| 2004/0225391 | A1 | 11/2004 | Fromherz et al. | |
| 2004/0225394 | A1 | 11/2004 | Fromherz et al. | |
| 2004/0247365 | A1 | 12/2004 | Lofthus et al. | |
| 2005/0071104 | A1* | 3/2005 | Viturro et al. | 702/85 |
| 2006/0033771 | A1 | 2/2006 | Lofthus et al. | |
| 2006/0039728 | A1 | 2/2006 | deJong et al. | |
| 2006/0066885 | A1 | 3/2006 | Anderson et al. | |
| 2006/0067756 | A1 | 3/2006 | Anderson et al. | |
| 2006/0067757 | A1 | 3/2006 | Anderson et al. | |
| 2006/0245781 | A1* | 11/2006 | Douglas et al. | 399/82 |

FOREIGN PATENT DOCUMENTS

| | | |
|---|---|---|
| EP | 1 626 312 | 2/2006 |

OTHER PUBLICATIONS

Morgan, P.F., "Integration of Black Only and Color Printers", Xerox Disclosure Journal, vol. 16, No. 6, Nov./Dec. 1991, pp. 381-383.
Desmond Fretz, "Cluster Printing Solution Announced", Today at Xerox (TAX), No. 1129, Aug. 3, 2001.
U.S. Appl. No. 10/785,211, filed Feb. 24, 2004, Lofthus et al.
U.S. Appl. No. 10/881,619, filed Jun. 30, 2004, Bobrow.
U.S. Appl. No. 10/917,676, filed Aug. 13, 2004, Lofthus et al.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,326, filed Nov. 30, 2004, Grace et al.
U.S. Appl. No. 10/999,450, filed Nov. 30, 2004, Lofthus et al.
U.S. Appl. No. 11/000,158, filed Nov. 30, 2004, Roof.
U.S. Appl. No. 11/000,168, filed Nov. 30, 2004, Biegelsen et al.
U.S. Appl. No. 11/000,258, filed Nov. 30, 2004, Roof.
U.S. Appl. No. 11/051,817, filed Feb. 4, 2005, Moore et al.
U.S. Appl. No. 11/070,681, filed Mar. 2, 2005, Viturro et al.
U.S. Appl. No. 11/081,473, filed Mar. 16, 2005, Moore.
U.S. Appl. No. 11/069,020, filed Feb. 28, 2005, Lofthus et al.
U.S. Appl. No. 11/089,854, filed Mar. 25, 2005, Clark et al.
U.S. Appl. No. 11/090,498, filed Mar. 25, 2005, Clark.
U.S. Appl. No. 11/090,502, filed Mar. 25, 2005, Mongeon.
U.S. Appl. No. 11/095,378, filed Mar. 31, 2005, Moore et al.
U.S. Appl. No. 11/094,998, filed Mar. 31, 2005, Moore et al.
U.S. Appl. No. 11/094,864, filed Mar. 31, 2005, de Jong et al.
U.S. Appl. No. 11/095,872, filed Mar. 31, 2005, Julien et al.
U.S. Appl. No. 11/102,355, filed Apr. 8, 2005, Fromherz et al.
U.S. Appl. No. 11/084,280, filed Mar. 18, 2005, Mizes.
U.S. Appl. No. 11/109,566, filed Apr. 19, 2005, Mandel et al.
U.S. Appl. No. 11/109,558, filed Apr. 19, 2005, Furst et al.
U.S. Appl. No. 11/109,996, filed Apr. 20, 2005, Mongeon et al.
U.S. Appl. No. 11/093,229, filed Mar. 29, 2005, Julien.
U.S. Appl. No. 11/102,899, filed Apr. 8, 2005, Crawford et al.
U.S. Appl. No. 11/102,910, filed Apr. 8, 2005, Crawford et al.
U.S. Appl. No. 11/115,766, filed Apr. 27, 2005, Grace.
U.S. Appl. No. 11/102,332, filed Apr. 8, 2005, Hindi et al.
U.S. Appl. No. 11/136,959, filed May 25, 2005, German et al.
U.S. Appl. No. 11/122,420, filed May 5, 2005, Richards.
U.S. Appl. No. 11/137,634, filed May 25, 2005, Lofthus et al.
U.S. Appl. No. 11/137,251, filed May 25, 2005, Lofthus et al.
U.S. Appl. No. 11/152,275, filed Jun. 14, 2005, Roof et al.
U.S. Appl. No. 11/156,778, filed Jun. 20, 2005, Swift.
U.S. Appl. No. 11/157,598, filed Jun. 21, 2005, Frankel.
U.S. Appl. No. 11/143,818, filed Jun. 2, 2005, Dalal et al.
U.S. Appl. No. 11/146,665, filed Jun. 7, 2005, Mongeon.
U.S. Appl. No. 11/166,299, filed Jun. 24, 2005, Moore.
U.S. Appl. No. 11/166,460, filed Jun. 24, 2005, Roof et al.
U.S. Appl. No. 11/166,581, filed Jun. 24, 2005, Lang et al.
U.S. Appl. No. 11/170,873, filed Jun. 30, 2005, Klassen.
U.S. Appl. No. 11/170,975, filed Jun. 30, 2005, Klassen.
U.S. Appl. No. 11/170,845, filed Jun. 30, 2005, Sampath et al.
U.S. Appl. No. 11/189,371, filed Jul. 26, 2005, Moore et al.
U.S. Appl. No. 11/212,367, filed Aug. 26, 2005, Anderson et al.
U.S. Appl. No. 11/208,871, filed Aug. 22, 2005, Dalal et al.
U.S. Appl. No. 11/215,791, filed Aug. 30, 2005, Hamby et al.
U.S. Appl. No. 11/234,468, filed Sep. 23, 2005, Hamby et al.
U.S. Appl. No. 11/234,553, filed Sep. 23, 2005, Mongeon.
U.S. Appl. No. 11/222,260, filed Sep. 8, 2005, Goodman et al.
U.S. Appl. No. 11/247,778, filed Oct. 11, 2005, Radulski et al.
U.S. Appl. No. 11/248,044, filed Oct. 12, 2005, Spencer et al.
U.S. Appl. No. 11/287,177, filed Nov. 23, 2005, Mandel et al.
U.S. Appl. No. 11/291,583, filed Nov. 30, 2005, Lang.
U.S. Appl. No. 11/291,860, filed Nov. 30, 2005, Willis.
U.S. Appl. No. 11/274,638, filed Nov. 15, 2005, Wu et al.
U.S. Appl. No. 11/287,685, filed Nov. 28, 2005, Carolan.
U.S. Appl. No. 11/317,589, filed Dec. 23, 2005,Biegelsen et al.
U.S. Appl. No. 11/314,774, filed Dec. 21, 2005, Klassen.
U.S. Appl. No. 11/317,167, filed Dec. 23, 2005, Lofthus et al.
U.S. Appl. No. 11/314,828, filed Dec. 21, 2005, Anderson et al.
U.S. Appl. No. 11/292,388, filed Nov. 30, 2005, Mueller.
U.S. Appl. No. 11/292,163, filed Nov. 30, 2005, Mandel et al.
U.S. Appl. No. 11/312,081, filed Dec. 20, 2005, Mandel et al.
U.S. Appl. No. 11/331,627, filed Jan. 13, 2006, Moore.
U.S. Appl. No. 11/341,733, filed Jan. 27, 2006, German.
U.S. Appl. No. 11/359,065, filed Feb. 22, 2005, Banton.
U.S. Appl. No. 11/349,828, filed Feb. 8, 2006, Banton.
U.S. Appl. No. 11/364,685, filed Feb. 28, 2006, Hindi et al.
U.S. Appl. No. 11/363,378, filed Feb. 27, 2006, Anderson et al.
U.S. Appl. No. 11/378,046, filed Mar. 17, 2006, Rizzolo et al.
U.S. Appl. No. 11/378,040, filed Mar. 17, 2006, German.
U.S. Appl. No. 11/403,785, filed Apr. 13, 2006, Banton et al.
U.S. Appl. No. 11/399,100, filed Apr. 6, 2006, Paul.
U.S. Appl. No. 11/417,411, filed May 4, 2006, DeGruchy.
U.S. Appl. No. 11/432,924, filed May 12, 2006, Lieberman et al.
U.S. Appl. No. 11/432,905, filed May 12, 2006, Mongeon et al.
U.S. Appl. No. 11/432,993, filed May 12, 2006, Anderson.

* cited by examiner

PARALLEL PRINTING SYSTEM

CROSS REFERENCE TO RELATED PATENTS AND APPLICATIONS

The following patents/applications, the disclosures of each being totally incorporated herein by reference are mentioned:

U.S. Publication No. US-2006-0114497-A1, Published Jun. 1, 2006, entitled "PRINTING SYSTEM," by David G. Anderson, et al., and claiming priority to U.S. Provisional Application Ser. No. 60/631,651, filed Nov. 30, 2004, entitled "TIGHTLY INTEGRATED PARALLEL PRINTING ARCHITECTURE MAKING USE OF COMBINED COLOR AND MONOCHROME ENGINES";

U.S. Publication No. US-2006-0067756-A1, filed Sep. 27, 2005, entitled "PRINTING SYSTEM," by David G. Anderson, et al., and claiming priority to U.S. Provisional Patent Application Ser. No. 60/631,918, filed Nov. 30, 2004, entitled "PRINTING SYSTEM WITH MULTIPLE OPERATIONS FOR FINAL APPEARANCE AND PERMANENCE," and U.S. Provisional Patent Application Ser. No. 60/631,921, filed Nov. 30, 2004, entitled "PRINTING SYSTEM WITH MULTIPLE OPERATIONS FOR FINAL APPEARANCE AND PERMANENCE";

U.S. Publication No. US-2006-0067757-A1, filed Sep. 27, 2005, entitled "PRINTING SYSTEM," by David G. Anderson, et al., and claiming priority to U.S. Provisional Patent Application Ser. No. 60/631,918, Filed Nov. 30, 2004, entitled "PRINTING System with Multiple Operations for Final Appearance and PERMANENCE," and U.S. Provisional Patent Application Ser. No. 60/631,921, filed Nov. 30, 2004, entitled "PRINTING SYSTEM WITH MULTIPLE OPERATIONS FOR FINAL APPEARANCE AND PERMANENCE";

U.S. Pat. No. 6,973,286, issued Dec. 6, 2005, entitled "HIGH RATE PRINT MERGING AND FINISHING SYSTEM FOR PARALLEL PRINTING," by Barry P. Mandel, et al.;

U.S. application Ser. No. 10/785,211, filed Feb. 24, 2004, entitled "UNIVERSAL FLEXIBLE PLURAL PRINTER TO PLURAL FINISHER SHEET INTEGRATION SYSTEM," by Robert M. Lofthus, et al.;

U.S. Application No. US-2006-0012102-A1, published Jan. 19, 2006, entitled "FLEXIBLE PAPER PATH USING MULTIDIRECTIONAL PATH MODULES," by Daniel G. Bobrow;

U.S. application Ser. No. 10/917,676, filed Aug. 13, 2004, entitled "MULTIPLE OBJECT SOURCES CONTROLLED AND/OR SELECTED BASED ON A COMMON SENSOR," by Robert M. Lofthus, et al.;

U.S. Publication No. US-2006-0033771-A1, published Feb. 16, 2006, entitled "PARALLEL PRINTING ARCHITECTURE CONSISTING OF CONTAINERIZED IMAGE MARKING ENGINES AND MEDIA FEEDER MODULES," by Robert M. Lofthus, et al.;

U.S. Pat. No. 7,924,152, issued Apr. 4, 2006, entitled "PRINTING SYSTEM WITH HORIZONTAL HIGHWAY AND SINGLE PASS DUPLEX," by Robert M. Lofthus, et al.;

U.S. Publication No. US-2006-0039728-A1, published Feb. 23, 2006, entitled "PRINTING SYSTEM WITH INVERTER DISPOSED FOR MEDIA VELOCITY BUFFERING AND REGISTRATION," by Joannes N. M. deJong, et al.;

U.S. application Ser. No. 10/924,458, filed Aug. 23, 2004, entitled "PRINT SEQUENCE SCHEDULING FOR RELIABILITY," by Robert M. Lofthus, et al.;

U.S. Publication No. US-2006-0039729-A1, published Feb. 23, 2006, entitled "PARALLEL PRINTING ARCHITECTURE USING IMAGE MARKING ENGINE MODULES (as amended)," by Barry P. Mandel, et al.;

U.S. Pat. No. 6,959,165, issued Oct. 25, 2005, entitled "HIGH RATE PRINT MERGING AND FINISHING SYSTEM FOR PARALLEL PRINTING," by Barry P. Mandel, et al.;

U.S. application Ser. No. 10/933,556, filed Sep. 3, 2004, entitled "SUBSTRATE INVERTER SYSTEMS AND METHODS," by Stan A. Spencer, et al.;

U.S. application Ser. No. 10/953,953, filed Sep. 29, 2004, entitled "CUSTOMIZED SET POINT CONTROL FOR OUTPUT STABILITY IN A TIPP ARCHITECTURE," by Charles A. Radulski, et al.;

U.S. Publication No. US-2006-0115284-A1, Published Jun. 1, 2006, entitled "SEMI-AUTOMATIC IMAGE QUALITY ADJUSTMENT FOR MULTIPLE MARKING ENGINE SYSTEMS," by Robert E. Grace, et al.;

U.S. application Ser. No. 10/999,450, filed Nov. 30, 2004, entitled "ADDRESSABLE FUSING FOR AN INTEGRATED PRINTING SYSTEM," by Robert M. Lofthus, et al.;

U.S. Publication No. US-2006-0115287-A1, Published Jun. 1, 2006, entitled "GLOSSING SYSTEM FOR USE IN A TIPP ARCHITECTURE," by Bryan J. Roof;

U.S. application Ser. No. 11/000,168, filed Nov. 30, 2004, entitled "ADDRESSABLE FUSING AND HEATING METHODS AND APPARATUS," by David K. Biegelsen, et al.;

U.S. Publication No. US-2006-0115288-A1, Published Jun. 1, 2006, entitled "GLOSSING SYSTEM FOR USE IN A TIPP ARCHITECTURE," by Bryan J. Roof;

U.S. Pat. No. 6,925,283, issued Aug. 2, 2005, entitled "HIGH PRINT RATE MERGING AND FINISHING SYSTEM FOR PARALLEL PRINTING," by Barry P. Mandel, et al.;

U.S. application Ser. No. 11/051,817, filed Feb. 4, 2005, entitled "PRINTING SYSTEMS," by Steven R. Moore, et al.;

U.S. application Ser. No. 11/069,020, filed Feb. 28, 2004, entitled "PRINTING SYSTEMS," by Robert M. Lofthus, et al.;

U.S. application Ser. No. 11/070,681, filed Mar. 2, 2005, entitled "GRAY BALANCE FOR A PRINTING SYSTEM OF MULTIPLE MARKING ENGINES," by R. Enrique Viturro, et al.;

U.S. Publication No. US-2006-0114313-A1, Published Jun. 1, 2006, entitled "PRINTING SYSTEM," by Steven R. Moore;

U.S. application Ser. No. 11/084,280, filed Mar. 18, 2005, entitled "SYSTEMS AND METHODS FOR MEASURING UNIFORMITY IN IMAGES," by Howard Mizes;

U.S. application Ser. No. 11/089,854, filed Mar. 25, 2005, entitled "SHEET REGISTRATION WITHIN A MEDIA INVERTER," by Robert A. Clark, et al.;

U.S. application Ser. No. 11/090,498, filed Mar. 25, 2005, entitled "INVERTER WITH RETURN/BYPASS PAPER PATH," by Robert A. Clark;

U.S. application Ser. No. 11/090,502, filed Mar. 25, 2005, entitled IMAGE QUALITY CONTROL METHOD AND APPARATUS FOR MULTIPLE MARKING ENGINE SYSTEMS," by Michael C. Mongeon;

U.S. application Ser. No. 11/093,229, filed Mar. 29, 2005, entitled "PRINTING SYSTEM," by Paul C. Julien;

U.S. application Ser. No. 11/095,872, filed Mar. 31, 2005, entitled "PRINTING SYSTEM," by Paul C. Julien;

U.S. application Ser. No. 11/094,864, filed Mar. 31, 2005, entitled "PRINTING SYSTEM," by Jeremy C. deJong, et al.;

U.S. application Ser. No. 11/095,378, filed Mar. 31, 2005, entitled "IMAGE ON PAPER REGISTRATION ALIGNMENT," by Steven R. Moore, et al.;

U.S. application Ser. No. 11/094,998, filed Mar. 31, 2005, entitled "PARALLEL PRINTING ARCHITECTURE WITH PARALLEL HORIZONTAL PRINTING MODULES," by Steven R. Moore, et al.;

U.S. application Ser. No. 11/102,899, filed Apr. 8, 2005, entitled "SYNCHRONIZATION IN A DISTRIBUTED SYSTEM," by Lara S. Crawford, et al.;

U.S. application Ser. No. 11/102,910, filed Apr. 8, 2005, entitled "COORDINATION IN A DISTRIBUTED SYSTEM," by Lara S. Crawford, et al.;

U.S. application Ser. No. 11/102,355, filed Apr. 8, 2005, entitled "COMMUNICATION IN A DISTRIBUTED SYSTEM," by Markus P. J. Fromherz, et al.;

U.S. application Ser. No. 11/102,332, filed Apr. 8, 2005, entitled "ON-THE-FLY STATE SYNCHRONIZATION IN A DISTRIBUTED SYSTEM," by Haitham A. Hindi;

U.S. application Ser. No. 11/109,558, filed Apr. 19, 2005, entitled "SYSTEMS AND METHODS FOR REDUCING IMAGE REGISTRATION ERRORS," by Michael R. Furst, et al.;

U.S. application Ser. No. 11/109,566, filed Apr. 19, 2005, entitled "MEDIA TRANSPORT SYSTEM," by Barry P. Mandel, et al.;

U.S. application Ser. No. 11/109,996, filed Apr. 20, 2005, entitled "PRINTING SYSTEMS," by Michael C. Mongeon, et al.;

U.S. application Ser. No. 11/115,766, Filed Apr. 27, 2005, entitled "IMAGE QUALITY ADJUSTMENT METHOD AND SYSTEM," by Robert E. Grace;

U.S. application Ser. No. 11/122,420, filed May 5, 2005, entitled "PRINTING SYSTEM AND SCHEDULING METHOD," by Austin L. Richards;

U.S. application Ser. No. 11/136,959, filed May 25, 2005, entitled "PRINTING SYSTEMS," by Kristine A. German, et al.;

U.S. application Ser. No. 11/137,634, filed May 25, 2005, entitled "PRINTING SYSTEM," by Robert M. Lofthus, et al.;

U.S. application Ser. No. 11/137,251, filed May 25, 2005, entitled "SCHEDULING SYSTEM," by Robert M. Lofthus, et al.;

U.S. Publication No. US-2006-0066885-A1, filed May 25, 2005, entitled "PRINTING SYSTEM," by David G. Anderson, et al.;

U.S. application Ser. No. 11/143,818, filed Jun. 2, 2005, entitled "INTER-SEPARATION DECORRELATOR," by Edul N. Dalal, et al.;

U.S. application Ser. No. 11/146,665, filed Jun. 7, 2005, entitled "LOW COST ADJUSTMENT METHOD FOR PRINTING SYSTEMS," by Michael C. Mongeon;

U.S. application Ser. No. 11/152,275, filed Jun. 14, 2005, entitled "WARM-UP OF MULTIPLE INTEGRATED MARKING ENGINES," by Bryan J. Roof, et al.;

U.S. application Ser. No. 11/156,778, filed Jun. 20, 2005, entitled "PRINTING PLATFORM," by Joseph A. Swift;

U.S. application Ser. No. 11/157,598, filed Jun. 21, 2005, entitled "METHOD OF ORDERING JOB QUEUE OF MARKING SYSTEMS," by Neil A. Frankel;

U.S. application Ser. No. 11/166,460, filed Jun. 24, 2005, entitled "GLOSSING SUBSYSTEM FOR A PRINTING DEVICE," by Bryan J. Roof, et al.;

U.S. application Ser. No. 11/166,581, filed Jun. 24, 2005, entitled "MIXED OUTPUT PRINT CONTROL METHOD AND SYSTEM," by Joseph H. Lang, et al.;

U.S. application Ser. No. 11/166,299, filed Jun. 24, 2005, entitled "PRINTING SYSTEM," by Steven R. Moore;

U.S. application Ser. No. 11/170,975, filed Jun. 30, 2005, entitled "METHOD AND SYSTEM FOR PROCESSING SCANNED PATCHES FOR USE IN IMAGING DEVICE CALIBRATION," by R. Victor Klassen;

U.S. application Ser. No. 11/170,873, filed Jun. 30, 2005, entitled "COLOR CHARACTERIZATION OR CALIBRATION TARGETS WITH NOISE-DEPENDENT PATCH SIZE OR NUMBER," by R. Victor Klassen;

U.S. application Ser. No. 11/170,845, filed Jun. 30, 2005, entitled "HIGH AVAILABILITY PRINTING SYSTEMS," by Meera Sampath, et al.;

U.S. application Ser. No. 11/189,371, filed Jul. 26, 2005, entitled "PRINTING SYSTEM," by Steven R. Moore, et al.;

U.S. application Ser. No. 11/208,871, filed Aug. 22, 2005, entitled "MODULAR MARKING ARCHITECTURE FOR WIDE MEDIA PRINTING PLATFORM," by Edul N. Dalal, et al.;

U.S. application Ser. No. 11/215,791, filed Aug. 30, 2005, entitled "CONSUMABLE SELECTION IN A PRINTING SYSTEM," by Eric Hamby, et al.;

U.S. application Ser. No. 11/222,260, filed Sep. 8, 2005, entitled "METHOD AND SYSTEMS FOR DETERMINING BANDING COMPENSATION PARAMETERS IN PRINTING SYSTEMS," by Goodman, et al.;

U.S. application Ser. No. 11/234,553, filed Sep. 23, 2005, entitled "MAXIMUM GAMUT STRATEGY FOR THE PRINTING SYSTEMS," by Michael C. Mongeon;

U.S. application Ser. No. 11/234,468, filed Sep. 23, 2005, entitled "PRINTING SYSTEM," by Eric Hamby, et al.;

U.S. application Ser. No. 11/247,778, filed Oct. 11, 2005, entitled "PRINTING SYSTEM WITH BALANCED CONSUMABLE USAGE," by Charles Radulski, et al.;

U.S. application Ser. No. 11/248,044, filed Oct. 12, 2005, entitled "MEDIA PATH CROSSOVER FOR PRINTING SYSTEM," by Stan A. Spencer, et al.; and U.S. application Ser. No. 11/274,638, filed Nov. 15, 2005, entitled "GAMUT SELECTION IN MULTI-ENGINE SYSTEMS," by Wencheng Wu, et al.;

U.S. application Ser. No. 11/287,177, filed Nov. 23, 2005, entitled "MEDIA PASS THROUGH MODE FOR MULTI-ENGINE SYSTEM," by Barry P. Mandel, et al.;

U.S. application Ser. No. 11/287,685, filed Nov. 28, 2005, entitled "MULTIPLE IOT PHOTORECEPTOR BELT SEAM SYNCHRONIZATION," by Kevin M. Carolan;

U.S. application Ser. No. 11/291,860, filed Nov. 30, 2005, entitled "MEDIA PATH CROSSOVER CLEARANCE FOR PRINTING SYSTEM," by Keith L. Willis;

U.S. application Ser. No. 11/292,388, filed Nov. 30, 2005, entitled "PRINTING SYSTEM," by David A. Mueller;

U.S. application Ser. No. 11/292,163, filed Nov. 30, 2005, entitled "RADIAL MERGE MODULE FOR PRINTING SYSTEM," by Barry P. Mandel, et al.;

U.S. application Ser. No. 11/291,583, filed Nov. 30, 2005, entitled "MIXED OUTPUT PRINTING SYSTEM," by Joseph H. Lang;

U.S. application Ser. No. 11/312,081, filed Dec. 20, 2005, entitled "PRINTING SYSTEM ARCHITECTURE WITH CENTER CROSS-OVER AND INTERPOSER BY-PASS PATH," by Barry P. Mandel, et al.;

U.S. application Ser. No. 11/314,828, filed Dec. 21, 2005, entitled "MEDIA PATH DIAGNOSTICS WITH HYPER MODULE ELEMENTS," by David G. Anderson, et al;

U.S. application Ser. No. 11/314,774, filed Dec. 21, 2005, entitled "METHOD AND APPARATUS FOR MULTIPLE PRINTER CALIBRATION USING COMPROMISE AIM," by R. Victor Klassen;

U.S. application Ser. No. 11/317,589, filed Dec. 23, 2005, entitled "UNIVERSAL VARIABLE PITCH INTERFACE INTERCONNECTING FIXED PITCH SHEET PROCESSING MACHINES," by David K. Biegelsen, et al.;

U.S. application Ser. No. 11/317,167, filed Dec. 23, 2005, entitled "PRINTING SYSTEM," by Robert M. Lofthus, et al.;

U.S. application Ser. No. 11/331,627, filed Jan. 13, 2006, entitled "PRINTING SYSTEM INVERTER APPARATUS", by Steven R. Moore;

U.S. application Ser. No. 11/341,733, filed Jan. 27, 2006, entitled "PRINTING SYSTEM AND BOTTLENECK OBVIATION", by Kristine A. German;

U.S. application Ser. No. 11/349,828, filed Feb. 8, 2005, entitled "MULTI-DEVELOPMENT SYSTEM PRINT ENGINE", by Martin E. Banton;

U.S. application Ser. No. 11/359,065, filed Feb. 22, 2005, entitled "MULTI-MARKING ENGINE PRINTING PLATFORM", by Martin E. Banton;

U.S. application Ser. No. 11/363,378, filed Feb. 27, 2006, entitled "SYSTEM FOR MASKING PRINT DEFECTS", by Anderson, et al.;

U.S. application Ser. No. 11/364,685, filed Feb. 28, 2006, entitled "SYSTEM AND METHOD FOR MANUFACTURING SYSTEM DESIGN AND SHOP SCHEDULING USING NETWORK FLOW MODELING", by Hindi, et al.;

U.S. application Ser. No. 11/378,046, filed Mar. 17, 2006, entitled "PAGE SCHEDULING FOR PRINTING ARCHITECTURES", by Charles D. Rizzolo, et al.;

U.S. application Ser. No. 11/378,040, filed Mar. 17, 2006, entitled "FAULT ISOLATION OF VISIBLE DEFECTS WITH MANUAL MODULE SHUTDOWN OPTIONS", by Kristine A. German, et al.;

U.S. application Ser. No. 11/399,100, filed Apr. 6, 2006, entitled "SYSTEMS AND METHODS TO MEASURE BANDING PRINT DEFECTS", by Peter Paul;

U.S. application Ser. No. 11/403,785, filed Apr. 13, 2006, entitled "MARKING ENGINE SELECTION", by Martin E. Banton et al.;

U.S. application Ser. No. 11/417,411, filed May 4, 2006, entitled "DIVERTER ASSEMBLY, PRINTING SYSTEM AND METHOD", by Paul J. Degruchy;

U.S. application Ser. No. 11/432,993, filed May 12, 2006, entitled "TONER SUPPLY ARRANGEMENT", by David G. Anderson;

U.S. application Ser. No. 11/432,924, filed May 12, 2006, entitled "AUTOMATIC IMAGE QUALITY CONTROL OF MARKING PROCESSES", by David J. Lieberman;

U.S. application Ser. No. 11/432,905, filed May 12, 2006, entitled "PROCESS CONTROLS METHODS AND APPARATUSES FOR IMPROVED IMAGE CONSISTENCY", by Michael C. Mongeon et al.; and U.S. Application Ser. No. 11/483,747, filed Jul. 5, 2006, entitled "POWER REGULATOR OF MULTIPLE MARKING ENGINES", by Murray O. Meetze, Jr.

BACKGROUND

The present disclosure relates to a xerographic printing system. More specifically, it relates to a printing system which includes an interposer to compile the outputs of multiple stand-alone printing systems. However, it is to be appreciated that the present exemplary embodiment is also amenable to other like applications.

Cluster printing systems provide a document production system wherein multiple printers are combined into a 'virtual' printer via job splitting software. To compile the printed output of the multiple printers, a user must manually recombine the outputs. Disadvantages associated with this type of manual system include a relatively slow compilation process and the opportunity for errors during the compilation stage.

Other approaches to provide document production systems including multiple printers are integrated printing systems. These integrated printing systems physically combine multiple printers via media paths including various nips and rollers. The print media is routed from the image marking areas of the individual printing modules to a common media path highway. The common media path highway integrates a sheet feeder system/module and a finishing system/module. A disadvantage associated with an integrated printing system, as described above, is the need to simultaneously control multiple printing modules and the various media paths. As more printing modules are integrated, the complexity of the overall document production system. Consequently, a sophisticated controller system becomes necessary to schedule operations for each printing module and cope with unplanned events such as jams, shutdowns, printer dead cycling, etc.

This disclosure provided a parallel printing system which includes an interposer to integrate the outputs of multiple stand alone printing systems.

BRIEF DESCRIPTION

A printing system is disclosed. The printing system comprises a first stand alone printing system and a second stand alone printing system and a second stand alone printing system, two or more interposer modules, each interposer module adapted to receive the print media output stacks from the first and second stand alone printing systems; one or more interface modules, the interface modules operatively connected to the two or more interposer modules, the interface modules adapted to sequentially collect a predetermined sequence of print media sheets associated with the print job and compiled from the print media output stacks received by the interposer modules; and a controller operatively connected to the two or more interposer modules and the one or more interface modules. The controller is configured to generate a command to transport one or more of the print media output stacks generated by one or more of the first and second stand alone printing systems to predetermined interposer print media stack inputs, and the controller is configured to control the sequencing of the print media sheets from the print media output stacks received by the interposer modules to the one or more interface modules, wherein the printing system is configured to merge the received print media sheets associated with the print media output stacks in a predetermined sequence associated with the print job, and outputting the merged print media sheets to the one or more interface modules and the controller is configured to execute the print job by performing a method comprising receiving a first document job from a job queue; assigning each document sheet of the first document job to the first printing system or the second printing system, wherein the first document job is divided into a first printing system print job and a second printing system print job; communicating the first printing system print job to the first printing system and communicating the second printing system print job to the second printing system, the first printing system and second printing system communicating to the controller the completion of their respective print jobs;

commanding the print media stack transport system to transport the first printing system output stack to the interposer first stack input; commanding the print media stack transport system to transport the second printing system output stack to the interposer second stack input; and commanding the interposer modules to assemble the first print job from the interposer first and second stack inputs, wherein the printed document sheets associated with the first and second stack inputs are selectively merged and routed to create a printed document sheet sequence representative of the first document print job a post print media handling system.

A method of executing a document job is disclosed. The method comprises receiving a first document print job in a controller, the controller generating a first printing system print job and generating a second printing system print job, wherein the first document print job is divided to generate first and second printing system print jobs. The controller communicates the first printing system print job to the first printing system and communicates the second printing system print job to the second printing system; the first printing system printing the first printing system print job and outputting the first printing system print job printed documents to a first output stacker operatively connected to the first printing system. The second printing system prints the second printing system print job and outputs the second printing system print job printed documents to a second output stacker operatively connected to the second printing system. The controller commands a print media stack transport system to transport the first printing system print job printed documents from the first output stacker to an interposer first stack input; and the controller commands a print media stack transport system to transport the second printing system print job printed documents from the second output stacker to an interposer second stack input; and the controller commands the interposer system to assemble the first document print job from the first and second stack inputs, wherein the printed sheets associated with the first and second stack inputs are selectively merged and routed to create a printed document stream representative of the first document print job.

A xerographic interposer system is disclosed. The xerographic interposer system comprising two or more interposer modules adapted to receive one or more print media input stacks, the interposer modules operatively connected to a print media path adapted to receive print media from the print media input stacks; one or more interface modules, the interface modules operatively connected to the two or more interposer modules; a controller operatively connected to the two or more interposer modules and the one or more interface modules, the controller configured to control the sequencing of print media sheets from the print media input stacks to the one or more interface modules, and the controller configured to generate a command to transport one or more print media stacks produced by one or more printing systems to predetermined interposer print media stack inputs. Two or more printing systems are operatively connected to the controller; and a print media stack transport system is operatively connected to the two or more printing systems and the controller, wherein the print media stack transport system transports print media stacks from the two or more printing systems to two or more interposer modules, and the print media interposer system is configured to merge the received print media input stacks in a predetermined sequence and output the merged print media to a post print media handling system.

DETAILED DESCRIPTION

Figure 1:
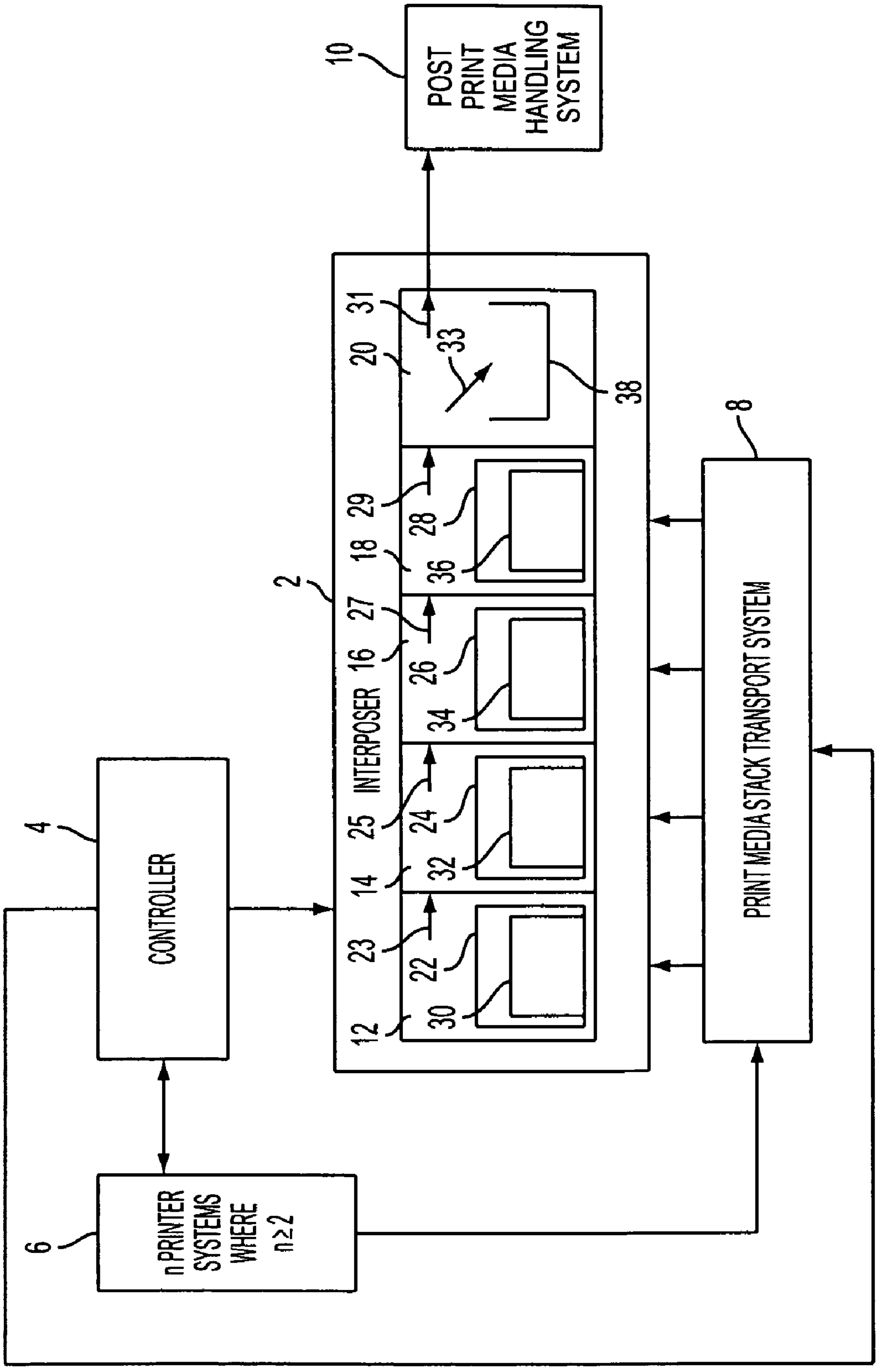
FIG. 1 is an illustration of a printing system according to an exemplary embodiment of this disclosure.

With reference to FIG. 1, illustrated is a printing system according to an exemplary embodiment of this disclosure. The printing system includes an interposer 2, a controller 4, n printing systems where n≧2 6, a print media stack transport system 8 and a post print media handling system 10.

The interposer 2 includes multiple interposer modules 12, 14, 16 and 18. Interposer module 12 includes an interposer module print media input 22 and corresponding interposer module print media input stack 30. Inter poser module 14 includes an interposer module print media input 24 and corresponding interposer module print media input stack 32. Interposer module 16 includes an interposer module print media input 26 and corresponding interposer module print media input stack 34. Interposer module 18 includes an interposer module print media input 28 and corresponding interposer module print media input stack 36. The fourth interposer 18 output is operatively connected to the input of an interface/purge module 20 which includes a print media output path operatively connected to the post print media handling system 10, and a print media purge path 33 which routes purged print media to a purge output stack 38.

With continuing reference to FIG. 1, the exemplary printing system illustrated includes a communication interface between the controller 4 and the interposer system 2, a communication interface between the n printing systems 6 and the controller 4, a communication interface between the n printing systems 6 and the print media stack transport system 8, and a communication interface between the controller 4 and the print media stack transport system 8. In addition, the print media stack transport system 8 is operatively connected to the interposer module system 2 as indicated by the arrows from the print media stack transport system 8 to the interposer system 2. Each arrow represents a print media stack delivery to a respective interposer module print media stack input.

In operation, the printing system illustrated in FIG. 1 receives a document print job via the controller 4. The controller 4 assigns each document sheet of the document print job to one of the n printing systems. For example, assuming the document print job includes 100 sequential sheets of printed media, and the system includes a first and second printing system. The controller may assign the first 50 pages of the print job to the first printing system and the last 50 pages of the print job to the second printing system.

Subsequently, the controller 4 communicates the first printing system print job to the first printing system, and communicates the second printing system print job to the second printing system. The printing systems print their respective sheets and output the printed sheets to a sheet stacking output. After completion of their respective print jobs, the first and second printing systems communicate to the controller 4 and/or the print media stack transport system 8, the completion of the print jobs.

At this point, the print media stack transport system 8 transports the first printing system output stack to the interposer 2, or more specifically an interposer module print media input, such as interposer module print media input 22, 24, 26 or 28. Furthermore, the print media stack transport system 8 transports the second printing system output stack to the interposer 2, or more specifically an interposer module print media input such as interposer module print media input 22, 24, 26 or 28. However, the first and second printing system output stacks are transported to different interposer module print media inputs for further processing by the interposer system 2.

For purposes of illustrating the operation of the interposer system 2 from this point, assume the output stack of the first printing system is transported to the first interposer module print media input 22, thereby positioning the first printing system output stack as the first interposer module print media input stack 30. Furthermore, assume the output stack of the second printing system is transported to the second interposer module print media input 24, thereby positioning the second printing system output stack as the second interposer module print media input stack 32. With the printing system output stacks positioned, as discussed above, printed sheets 1-50 of the original print job are located within the first interposer module 12 and printed sheets 51-100 of the original print job are located within the second interposer module 14.

To assemble or compile the printed sheets, the interposer system sequentially processes the first interposer print media input stack by routing these printed sheets via interposer module print media paths 23, 25, 27 and 29. The printed media sheets are subsequently routed to the post print media handling system 10 via the interface/purge module print media output 31. Subsequent to the sequential processing of printed sheets 1-50, printed sheets 51-100 are sequentially routed via interposer module print media paths 25, 27 and 29. Printed sheets 51-100 are then routed to the post print media handling system 10 via the interface/purge module print media output 31.

At this point, the original print job is completed, provided any post handling of the printed sheets is finished.

The printing system illustrated in FIG. 1 and described heretofore, provides a means of integrating the output of multiple printing systems, whereby the printed media of the multiple printing systems is compiled and/or merged by an interposer system as disclosed. A print media transport system provides a means for integrating the multiple printing systems and the interposer system.

Other variations and modifications of the printing system described heretofore are described below.

With continuing reference to FIG. 1, an optional interface/purge module 20 is illustrated. The interface/purge module provides an interface from the interposer modules to the post print media handling system 10. In addition, the interface/purge module provides a means for discarding unneeded media sheets which are included in the interposer module print media input stacks. For example, one exemplary embodiment of this disclosure includes a traveler sheet printed by each printing system and located at the top of the respective printing system output stack. The traveler sheet identifies one or more attributes associated with the print stack. For example, the document print job ID, the interposer module destination, etc. Once the print stack and associated traveler sheet have been placed in the appropriate interposer module input, the traveler sheet is processed by the interposer system and ejected via the interface/purge module 20.

Another exemplary embodiment of the printing system illustrated in FIG. 1, comprises 2, 3, 5, 6, or more interposer modules and 2, 3, 4, 5, 6, or more printing systems, where the printing systems are a combination of monochrome, color, etc. In addition, the document job processed by the controller 4 can be divided and assigned to printing systems based on the color content of a particular sheet or other marking attributes which must be performed by one or more specific printing systems. The output stacks of the printing systems may contain one or more printed media sheets in a predetermined order such as odd numbered pages, even numbered pages, or identical printed sheets for placement within a stream of sheets being merged and compiled by the interposer system.

Figure 2:
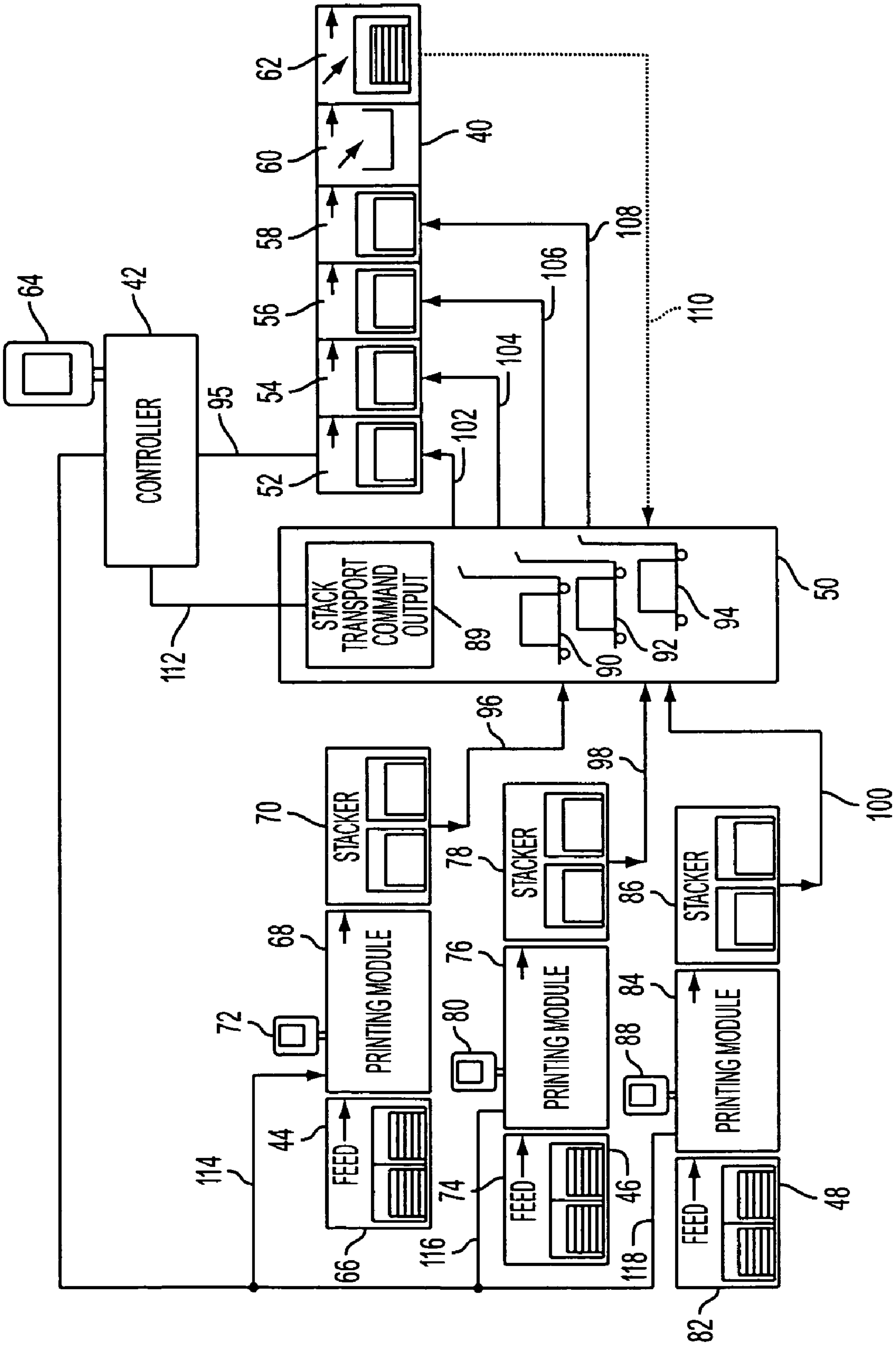
FIG. 2 is an illustration of a printing system according to another exemplary embodiment of this disclosure.

With reference to FIG. 2, illustrated is another exemplary embodiment of this disclosure. The printing system includes an interposer system 40, a controller 42, a controller graphical user interface (GUI) 64, a first printing system 44, a second printing system 46, a third printing system 48, and a print media stack transport system 50.

The interposer system 40 includes a first interposer module 52, a second interposer module 54, a third interposer module 56, a fourth interposer module 58, an interface/purge module 60 and an interposer print media output stacker 62.

The first printing system includes a printing system sheet feeder 66, a printing module 68 for image marking, an output stacker 70 and a GUI 72.

The second printing system includes a printing system sheet feeder 74, a printing module 76 for image marking, an output stacker 78 and a GUI 80.

The third printing system includes a printing system sheet feeder 82, a printing module 84 for image marking, an output stacker 86 and a GUI 88.

The print media stack transport system 50 includes a stack transport command output 89, a first print media stack cart 90, a second print media stack cart 92 and a third media stack cart 94.

With continuing reference to FIG. 2, the exemplary printing system illustrated includes a communication interface 95 between the controller 42 and the interposer 40, a communication interface 112 between the controller 42 and the print media stack transport system 50, a communication interface 114, 116 and 118 between the controller 42 and the first printing system 44, the second printing system 46 and the third printing system 48 respectively. In addition, the printing system illustrated in FIG. 2 includes a print media flow path 96 from the first printing system 44 to the print media stack transport system 50, a print media flow path 98 from the second printing system 46 to the print media stack transport system 50 and a print media flow path 100 from the third printing system 48 to the print media stack transport system 50.

Print media flow 102, 104, 106 and 108 represent print media flow via the print media stack transport system 50 to interposer modules 52, 54, 56 and 58, respectively. Print media flow 110 represents the optional print media flow from the interposer print media output stacker 62 via the print media stack transport system 50.

In operation, the printing system illustrated in FIG. 2 receives a document print job via the controller 4 or GUI 64. The controller 4 and/or GUI 64 can be connected to a network (not shown) which provides the document print job file(s). The controller 4 assigns each document sheet of the document print job to one of the three printing systems 44, 46 and 48. Subsequently, the controller 4 communicates a first printing system print job, a second printing system print job and a third printing system print job to respective printing systems 44, 46 and 48.

The printing systems complete their assigned/communicated print jobs and produce print stacks at their respective output stackers 70, 78 and 86.

The print media stack transport system transports the printing system output stacks from the output stackers 70, 78 and 86 to the appropriate interposer modules 52, 54, 56, and 58.

From this point, the interposer system 40 assembles the document print job in the appropriate sheet sequence and ejects any unnecessary sheets, such as a traveler sheet, via the interface/purge module. The assembled document print job is outputted from the interposer system 40 via the interposer print media output stacker 62.

The assembled document print job can be optionally transported via the print media stack transport system 50 to a subsequent operation, for example, a finishing module or storage area, or another means of transporting the assembled document print job can be provided.

Figure 3:
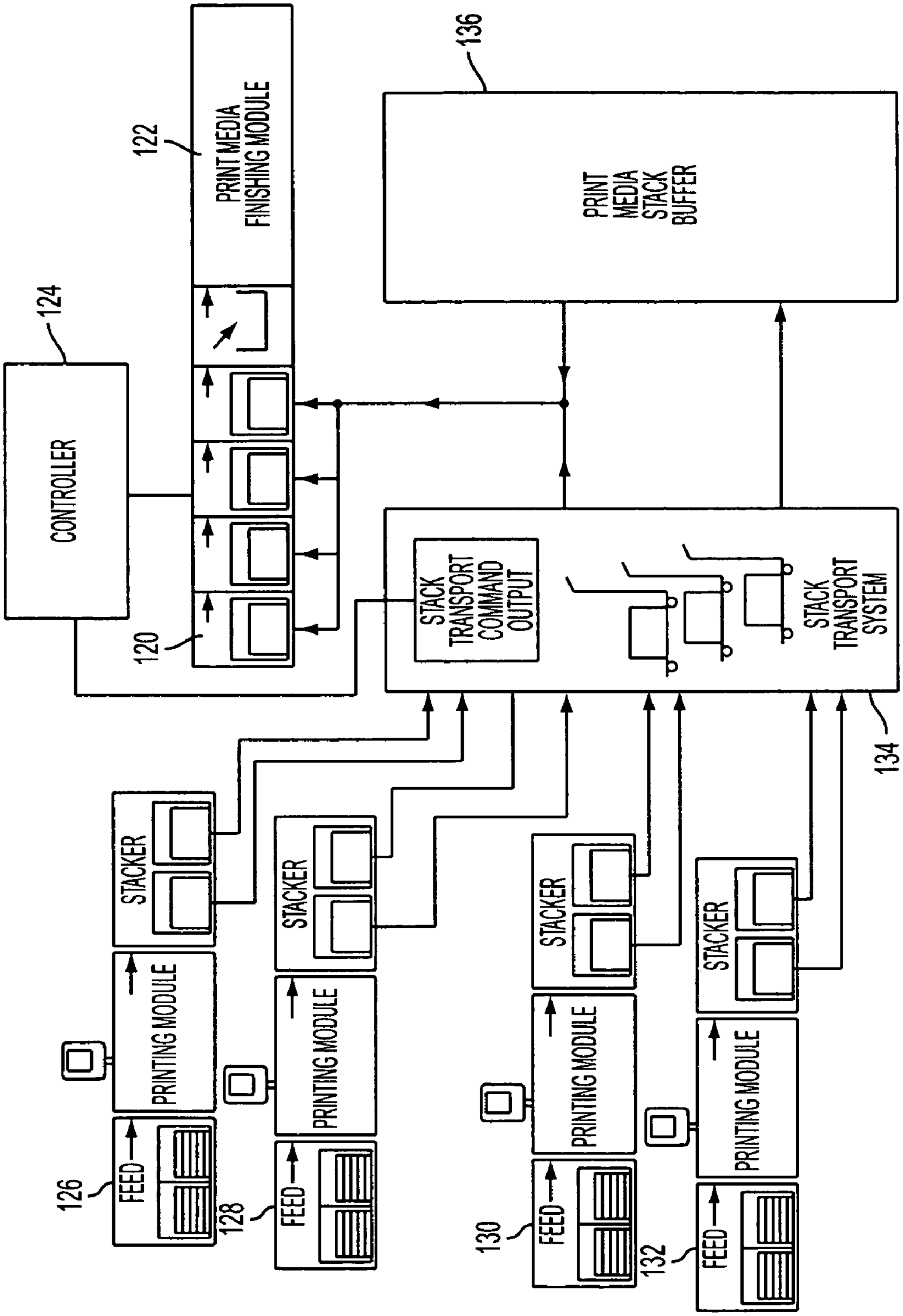
FIG. 3 is an illustration of a printing system according to another exemplary embodiment of this disclosure.

With reference to FIG. 3, illustrated is another exemplary embodiment of this disclosure. The printing system includes an interposer system 120, a controller 124, a first printing system 126, a second printing system 128, a third printing system 130, a fourth printing system 132, a print media stack transport system 134, and a print media stack buffer 136.

According to one exemplary embodiment of this disclosure, the printing system described with reference to FIG. 2 includes an image quality control module to measure and control the image quality associated with one or more of the first, second and third printing systems.

According to another exemplary embodiment of this disclosure, the image quality control module includes a scanner and one or more periodic calibration target files associated with the printing systems, wherein the scanner output and the periodic calibration target files control set points associated with the printing systems' total response curves.

In addition, a print media finishing module 122 is integrated with the interposer system 120.

The operation of the printing system illustrated in FIG. 3 is similar to the printing systems discussed with reference to FIG. 1 and FIG. 2. Notable differences include four printing systems, the integrated print media finishing module 122 and print media stack buffer 136.

The print media stack buffer 136 provides an area to store print media output stacks from one or more of printing systems 126, 128, 130 and 132, until the interposer system 120 has completed any previous document print jobs and/or is put into service. Furthermore, the print media stack buffer 136 provides a staging area for storing one or more print media stacks until all print media stacks required for assembly by the interposer system 120, are completed by the printing systems 126, 128, 130 and 132.

Figure 4A:
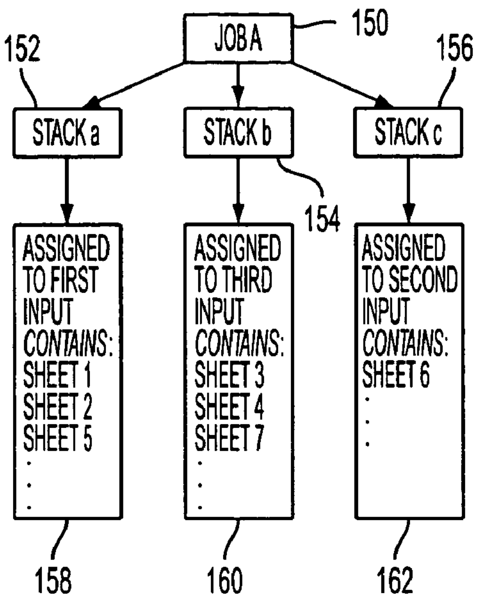
FIG. 4A and FIG. 4B illustrate a method of document production according to an exemplary embodiment of this disclosure.
Figure 4B:
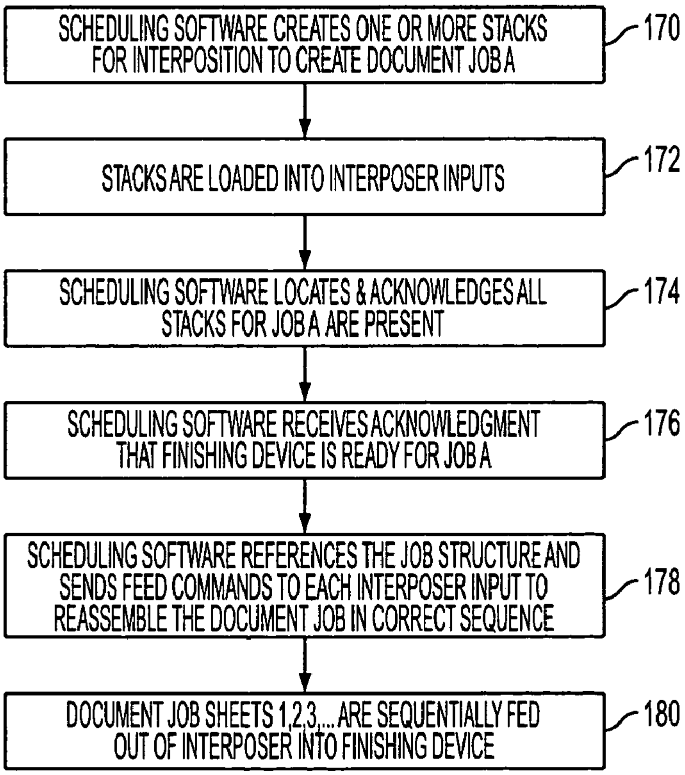

With reference to FIGS. 4A and 4B, illustrated are flow charts representing a method of document production according to an exemplary embodiment of this disclosure. The diagrams of FIG. 4A and FIG. 4B provide an example of the operation of an interposer system, as related to a document print Job A.

Initially, the document print Job A 150 is divided and assigned to one or more printing systems which produce stack a 152, stack b 154, and stack c 156. Subsequently, stack a 152 is assigned 158 to a first stack input of the interposer system, stack b 154 is assigned 160 to a third stack input of the interposer system, and stack c 156 is assigned 162 to a second input of the interposer system. As illustrated in FIG. 4A, stack a includes sheet 1, sheet 2, sheet 5; stack b includes sheet 3, sheet 4 and sheet 7; and stack c includes sheet 6.

Subsequent to the loading of stack a, stack b and stack c, the interposer system merges sheets from the interposer stack inputs to assemble print Job A.

With reference to FIG. 4B, illustrated is a flow chart representing the operation of an exemplary embodiment of this disclosure.

In operation, the scheduling software initially creates 170 one or more stacks for interposition to create a document Job A.

Next, the stacks are loaded 172 into interposer inputs.

Next, the scheduling software locates and acknowledges 174 all stacks for Job A are present.

Next, the scheduling software receives acknowledgement 176 that the finishing device is ready for Job A.

Next, the scheduling software references the job structure and sends 178 feed commands to each interposer input to reassemble the document job in correct sequence.

Finally, document job sheets 1, 2, 3, . . . are sequentially fed 180 out of the interposer into the finishing device.

Figure 5:
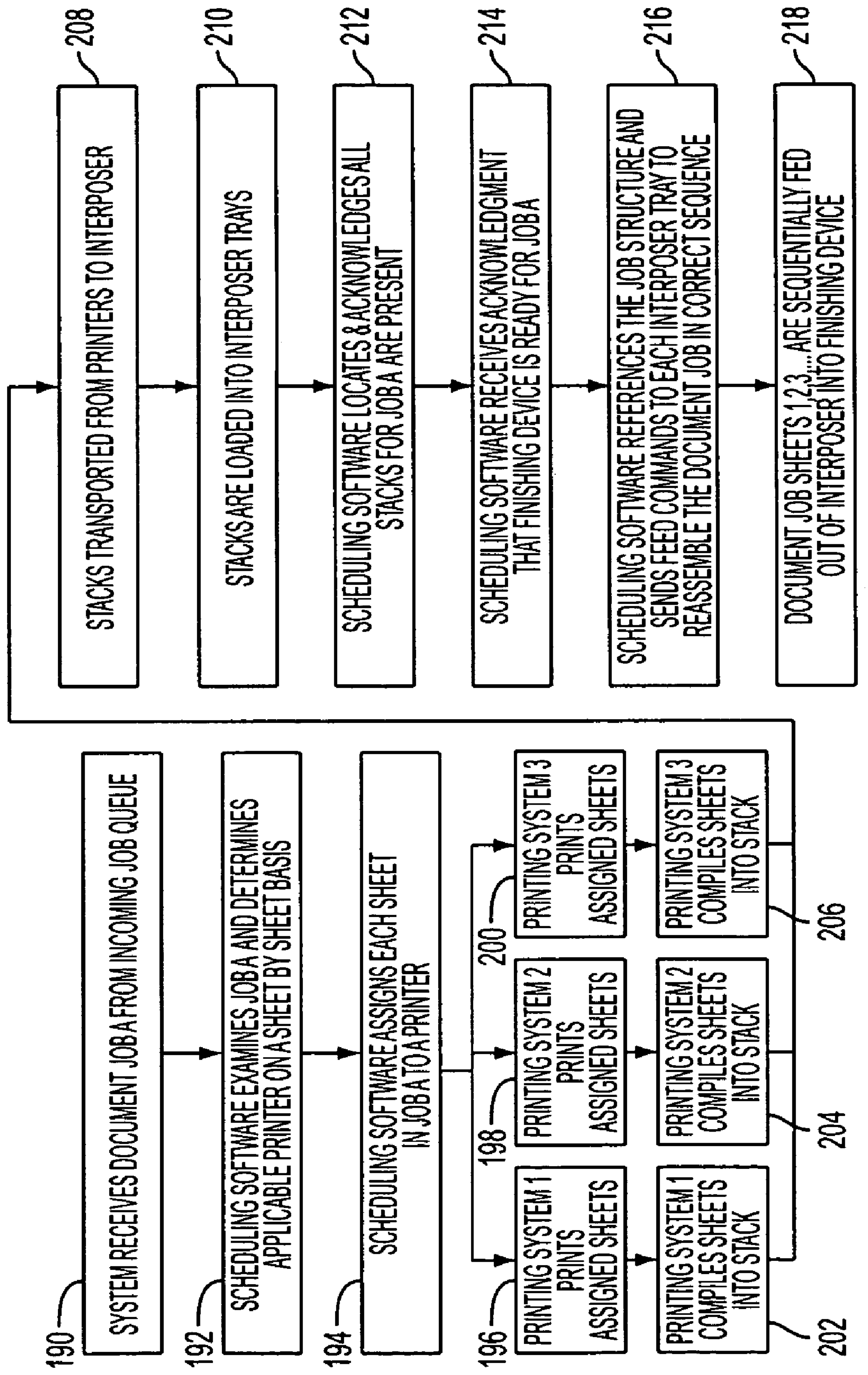
FIG. 5 is a flow chart illustrating a document production method according to an exemplary embodiment of this disclosure.

With reference to FIG. 5, illustrated is another exemplary flow chart illustrating a document production method according to an exemplary embodiment of this disclosure.

Initially, the system receives 190 a document job from an incoming job queue.

Next, the scheduling software examines 192 Job A and determines the applicable printer or printing system on a sheet by sheet basis.

Subsequently, the scheduling software assigns 194 each sheet in Job A to a printer or printing system.

At this point, printing system 1 prints 196 its assigned sheets, printing system 2 prints 198 its assigned sheets and printing system 3 prints 200 its assigned sheets.

Next, printing system 1 compiles 202 its sheets into a stack, printing system 2 compiles 204 its sheets into a stack, and printing system 3 compiles 206 its sheets into a stack.

At this point, the stacks are transported 208 to the interposer system.

Next, the stacks are loaded 210 into interposer trays.

Next, the scheduling software locates and acknowledges 212 all stacks for Job A are present.

Next, the scheduling software receives 214 acknowledgement that the finishing device is ready for Job A.

Next, the scheduling software references the job structure and sends 216 feed commands to each interposer tray to reassemble the document job in correct sequence.

Finally, document job sheets 1, 2, 3, . . . are sequentially fed 218 out of the interposer into the finishing device.

Figure 6:
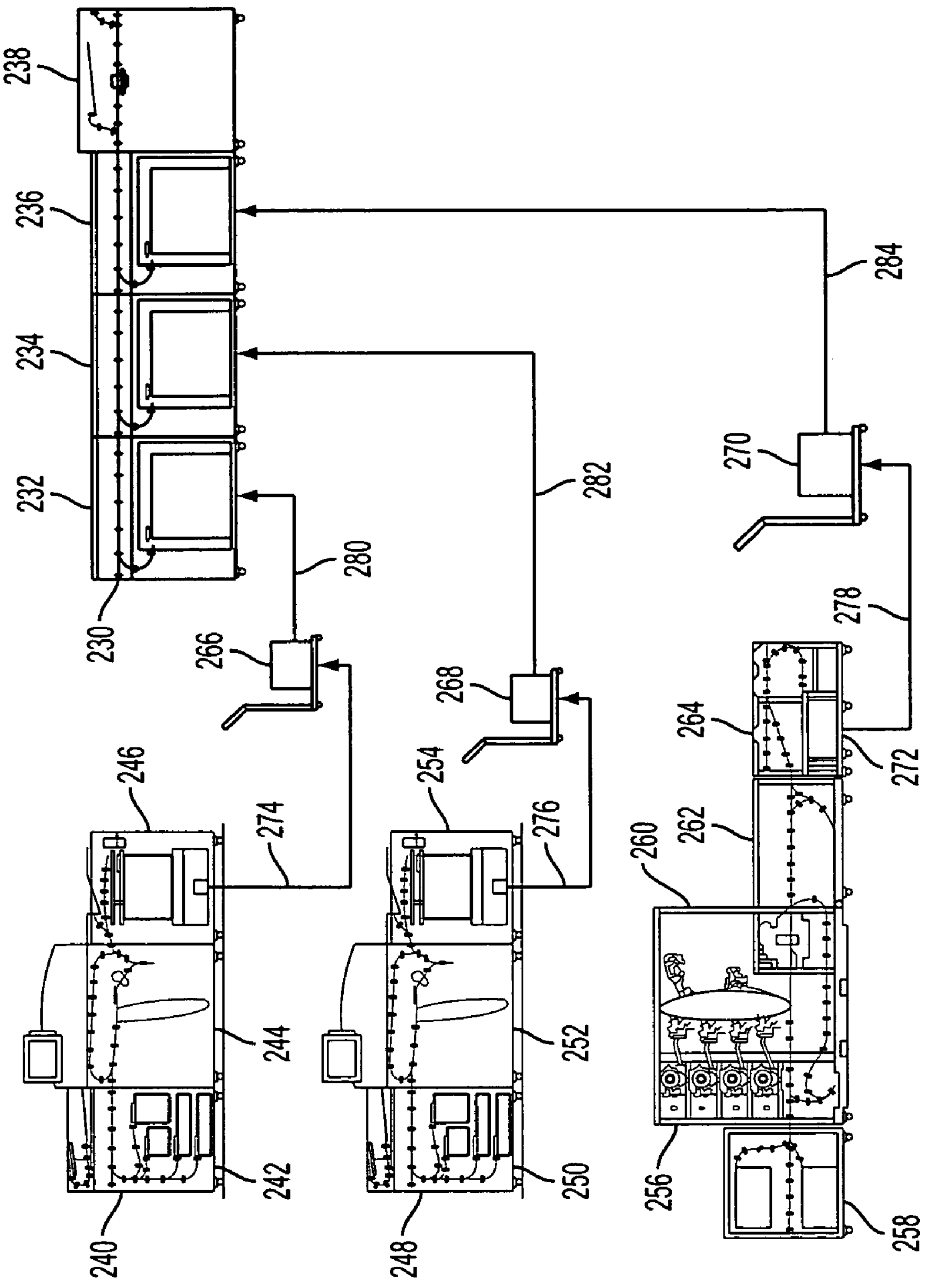
FIG. 6 illustrates a printing system according to another embodiment of this disclosure.

With reference to FIG. 6, illustrated is another exemplary embodiment of a printing system according to this disclosure. The printing system includes an interposer system 230, a first monochrome printing system 240, a second monochrome printing system 248, a color printing system 256, a first print media stack cart 266, a second print media stack cart 268 and a third print media stack cart 270.

The interposer system includes a first interposer module 232, a second interposer module 234, a third interposer module 236 and a finishing/stacker module 238.

The first monochrome printing system 240 includes a sheet feeder module 242, a monochrome printing module 244 and a sheet output stacker 246.

The second monochrome printing system 248 includes a sheet feeder module 250, a monochrome printing module 252 and a sheet output stacker 254.

The color printing system 256 includes a sheet feeder module 258, a color printing module 260, a duplex/interface module 262 and an output module 264. The output module 264 includes an output stack 272.

As illustrated in FIG. 6, the first print media stack cart 266 transports stacks from the first monochrome printing system 240 to the interposer system along print media flow paths 274 and 280. The second print media stack cart 268 transports stacks from the second monochrome printing system 248 to the interposer system along print media paths 276 and 282. The third print media stack cart 270 transports stacks from the color printing system 256 to the interposer system 230 along print media paths 278 and 284.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A printing system comprising:

a first stand alone printing system and a second stand alone printing system, the printing systems not sharing a common media routing path, and each printing system adapted to generate a print media output stack including a plurality of print media sheets associated with a print job;

two or more interposer modules, each interposer module including a plurality of print media sheet stack inputs and the interposer modules adapted to manually receive the print media output stacks from the first and second stand alone printing systems where any of the plurality of print media stack inputs can receive print media output stacks from both the first and second stand alone printing systems;

a manual print media stack transport system adapted to manually transport print media output stacks from the first and second stand alone print systems to the plurality of print media sheet inputs associated with the two or more interposer modules;

one or more interface modules, the interface modules operatively connected to the two or more interposer modules, the interface modules adapted to sequentially collect a predetermined sequence of print media sheets associated with the print job and which are compiled from the print media output stacks received by the interposer modules; and a controller operatively connected to the two or more interposer modules and the one or more interface modules, the controller configured to generate a command to manually transport one or more of the print media output stacks generated by one or more of the first and second stand alone printing systems to predetermined interposer print media stack inputs, and the controller configured to control the sequencing of the print media sheets from the print media output stacks received by the interposer modules to the one or more interface modules, wherein the printing system is configured to merge the received print media sheets associated with the print media output stacks in a predetermined sequence associated with the print job, and outputting the merged print media sheets to the one or more interface modules and the controller is configured to execute the print job by performing a method comprising:

receiving a first document job from a job queue;

assigning each document sheet of the first document job to the first printing system or the second printing system, wherein the first document job is divided into a first printing system print job and a second printing system print job;

communicating the first printing system print job to the first printing system and communicating the second printing system print job to the second printing system, the first printing system and second printing system communicating to the controller the completion of their respective print jobs;

commanding the manual print media stack transport system to transport the first printing system output stack to one of the interposer first stack input and the interposer second stack input;

commanding the manual print media stack transport system to transport the second printing system output stack to the other of the interposer first stack input and the interposer second stack input; and commanding the interposer modules to assemble the first print job from the interposer first and second stack inputs, wherein the printed document sheets associated with the first and second stack inputs are selectively merged and routed to create a printed document sheet sequence representative of the first document print job.

2. The printing system according to claim 1, further comprising:

a purge module operatively connected to the two or more interposer modules, wherein the purge module is configured to selectively eject print media sheets from the one or more print media input stacks.

3. The printing system according to claim 1, further comprising:

a print media stack buffer area, the buffer area operatively connected to the manual print media stack transport system, wherein the buffer area stores print media stacks from the first and second printing systems.

4. The printing system according to claim 1, the manual print media stack transport system comprising:

one or more print media stack carts, wherein the print media stack carts manually transport print media stacks from the first and second printing systems to the two or more interposer modules.

5. The printing system according to claim 1, wherein the controller is configured to selectively route predetermined print media associated with the first and second stack inputs to the purge module and selectively purging the predetermined print media.

6. The printing system according to claim 1, further comprising:

an image quality control module, wherein the image quality control module measures and controls the image quality of the first and second printing systems.

7. The printing system according to claim 6, the image quality module further comprising:

a scanner, and one or more periodic calibration target files associated with the first and second printing systems, wherein the scanner output and the one or more periodic calibration target files control set points associated with the first and second printing systems' total response curves.

8. The printing system according to claim 1, the first and second printing systems comprising:

a monochrome printing system; and a color printing system.

9. The printing system according to claim 1, further comprising:

a graphical user interface operatively connected to the controller, the graphical user interface configured to command a user to manually transport one or more print media stacks from the first and second printing systems to one or more interposer module stack inputs.

10. The printing system according to claim 1, comprising a print media finishing module.

11. The printing system according to claim 1, wherein the printing system is configured to read one or more traveler sheets associated with the print media input stacks produced by the first and second printing systems.

12. The printing system according to claim 11, wherein the traveler sheets identify the contents of the print media input stack below the traveler sheet.

13. The printing system according to 12, wherein the traveler sheets identify the document job ID and/or the destination interposer stack input.

* * * * *